(12) United States Patent
Hutson et al.

(10) Patent No.: US 7,917,477 B2
(45) Date of Patent: Mar. 29, 2011

(54) MEDIA CONTENT REMOVAL SYSTEM AND METHOD

(75) Inventors: William E. Hutson, Cary, NC (US); David B. Lection, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1274 days.

(21) Appl. No.: 11/461,847

(22) Filed: Aug. 2, 2006

(65) Prior Publication Data

US 2008/0046599 A1 Feb. 21, 2008

(51) Int. Cl.
*G06F 7/52* (2006.01)
(52) U.S. Cl. .................... 707/668; 707/682
(58) Field of Classification Search .......... 707/610–620, 707/640–686
See application file for complete search history.

(56) References Cited

U.S. PATENT DOCUMENTS

| 2002/0040389 | A1* | 4/2002 | Gerba et al. ................. 709/219 |
| 2005/0193017 | A1* | 9/2005 | Kim .......................... 707/104.1 |
| 2006/0294376 | A1* | 12/2006 | Sands et al. ................... 713/168 |
| 2007/0055743 | A1* | 3/2007 | Pirtle et al. ................... 709/217 |
| 2007/0209005 | A1* | 9/2007 | Shaver et al. ................. 715/733 |

* cited by examiner

*Primary Examiner* — Wilson Lee
(74) *Attorney, Agent, or Firm* — Cantor Colburn LLP

(57) ABSTRACT

A method of removing stored media content from a media player (MP) is disclosed. The method includes allowing a first set of media content to be downloaded to the MP for playing, and identifying a second set of media content from all media content stored on the MP. In response to the identifying the second set of media content, automatically copying the second set of media content from the MP to a processing unit in signal connection with the MP for archival storage, and, automatically removing the second set of media content from the MP. The identifying the second set of media content occurs in response to at least one of: the current time matching a date and time combination specified by a user to remove the media content; and, playing the first set of media content.

16 Claims, 2 Drawing Sheets

MEDIA CONTENT REMOVAL SYSTEM AND METHOD

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to media devices, and particularly to personal media players.

2. Description of Background

Media players (MP)s are extremely popular. These players allow the user to download an array of media content to the players and play the content. Media content is commonly music files encoded in Moving Picture Experts Group (MPEG)-1 Audio Layer 3 (MP3) format, audio podcasts encoded in MP3 or other audio format, and video encoded in one of the MPEG standards for video. Most players in the current art allow the user to assemble at least one playlist. Each playlist is a list that may be a portion of the content stored within the player. The playlist may specify a sequential order for the content of the playlist, or may specify the content of the playlist to be played back randomly, the random playback also known as shuffle play.

Current MPs require that a user initiate the playback of the playlist, and continue to play only the media content within the playlist until the user causes it to cease. Further, they require the user to manually manage storage of the media on the MP to ensure that adequate storage space is available for the addition of media for subsequent playlists.

SUMMARY OF THE INVENTION

The shortcomings of the prior art are overcome and additional advantages are provided through the provision of a method and system to automatically remove content from the PMP, thereby providing the necessary storage space for the subsequent addition of media content.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which will allow the user to specify a manner of automatic management of the storage of media content within the MP.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

An embodiment of the invention will allow a user to develop a time-schedule playlist to play specific content contained within the MP at specific times. In an embodiment, the time-schedule playlist will allow the user to specify a response to gaps in the initial schedule. In another embodiment, the MP will interrupt the media scheduled by the time-schedule playlist with priority content media that the user has specified, and will shift or rejoin the time-schedule playlist in a manner specified by the user. In an embodiment, the MP will schedule the removal of content to ensure availability of storage space for new content.

Figure 1:
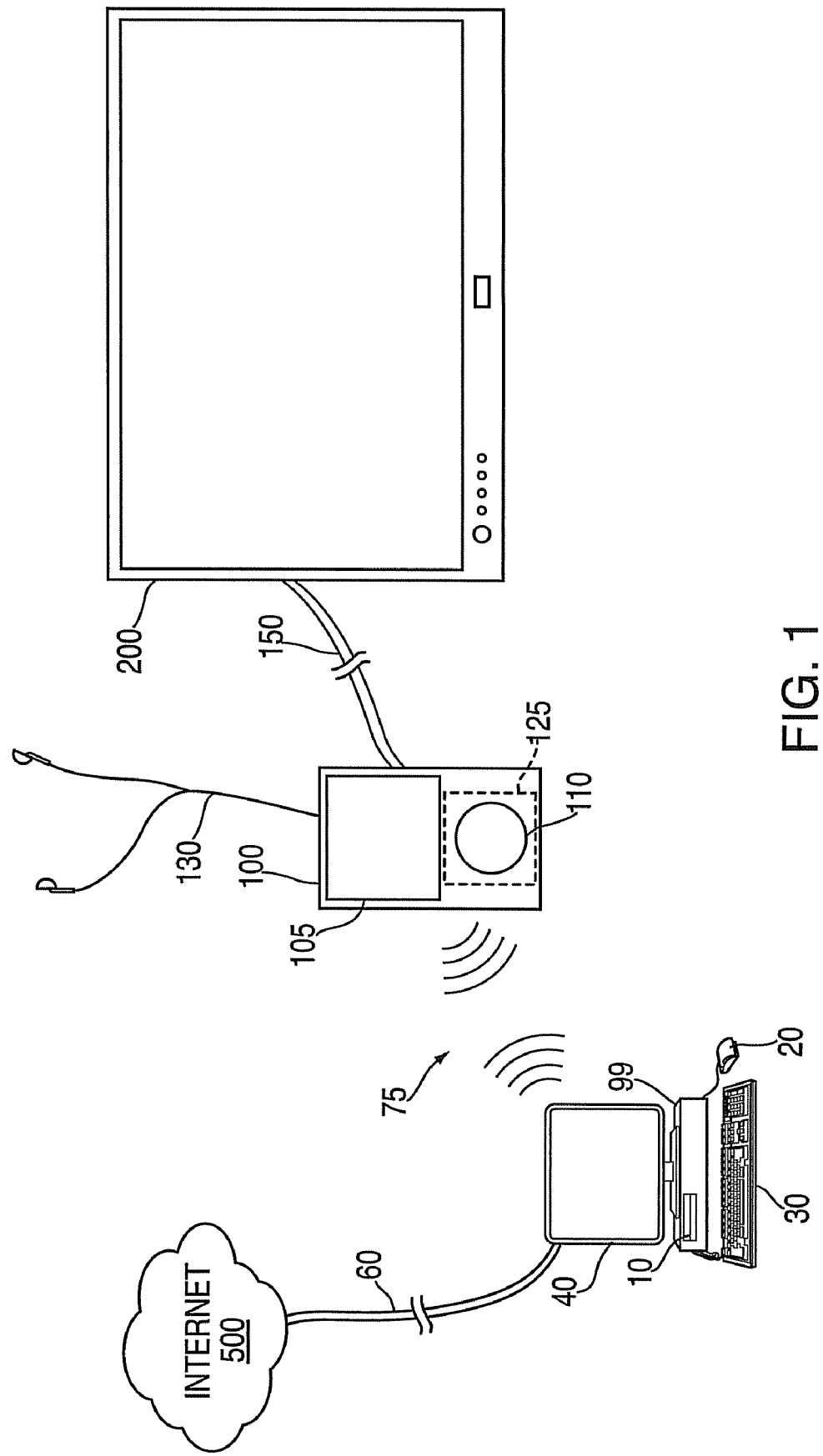
FIG. 1 illustrates one example of a media playback system in accordance with an embodiment of the invention.

FIG. 1 depicts an embodiment of an exemplary personal media player (PMP) 100. The PMP 100 is configured be carried by a person, and to store and play at least one media program of a set of media programs (also herein generally referred to as content), such as audio and video media, for example. In an embodiment, the PMP 100 is configured and sized to be easily carried in one hand of a person. The PMP 100 has a viewing screen 105 for viewing video media, a listening device (also herein referred to as earphones) 130 for listening to audio contained within the media program, and an interface device 110 for selecting the content to play, as well adjusting configuration settings of the PMP 100. The PMP 100 also has an internal program storage device 125 for storing the operating program and the media content. The PMP 100 may be used in conjunction with earphones 130, and viewing screen 105 to play media content. Additionally, the PMP 100 may utilize a signal connection 150 to a larger monitor 200, such as a television, for example, for the playing of video and audio. In an embodiment, the PMP 100 is also in signal connection with a processing unit 99, which is in data communication with a program storage device 10. The processing unit 99 may be in data communication with input devices, such as a mouse 20 and a keyboard 30, for example, and an output device, such as a display screen 40. In an embodiment, a software program running on the program storage device 10 is used to specify and obtain the media content via a network connection 60 to an internet 500, such as the World Wide Web, for example. In an embodiment, the media content obtained via the network connection 60 to the internet 500 may be transferred to the PMP 100 via a wireless connection between the processing unit 99 and the PMP 100, depicted by reference numeral 75. In an embodiment, the internet 500 is in signal communication with the PMP 100, and the PMP 100 is configured to store and play the at least one media program of the set of media programs downloaded from the internet 500.

While an embodiment of the invention has been described as a media playback system having a personal media player (PMP), it will be appreciated that the scope of the invention is not so limited, and that the invention will also apply to other media playback systems configured to download and play an array of media content, having stationary MPs, often known as digital video recorders (DVR)s, such as may be independently connected with the video monitor, situated within an entertainment system, included within a cable converter, and situated within a computing system, for example.

While an embodiment of the invention has been depicted with a PMP in signal connection with a processing unit via a wireless connection, it will be appreciated that the scope of the invention is not so limited, and that the invention will also apply to other methods of data communication, such as wired connection networks, for example. Further, while an embodiment of the invention has been depicted with a processing unit in connection with the internet via a wired connection, it will be appreciated that the scope of the invention is not so limited, and that the invention will also apply to other methods of data communication, such as wireless connection networks, for example. While an embodiment of the invention has been depicted with a PMP in connection with the internet via a processing unit, it will be appreciated that the scope of the invention is not so limited, and that the invention will also apply to PMPs that may be in direct connection with the internet, via wired or wireless connections, for example. While an embodiment of the invention has been depicted with a connection to the internet, it will be appreciated that the scope of the invention is not so limited, and that the invention will also apply to media systems that may be connected to other networking environments, such as an intranet and an extranet, for example.

In an embodiment of the invention, the PMP 100 is configured to play a set of media programs, also herein referred to as media content, in a time-schedule playlist specified by a user, the time-schedule playlist comprising times and dates to begin playing each media program of the set of media programs specified by the user. In an embodiment of the invention, the user will be able to establish the time-schedule playlist by identifying at least one specific media program stored on the PMP 100 to be played. In an embodiment, the user will continue to establish the time-schedule playlist by specifying the date and time to begin playback of each media program. A simple example of the time-schedule playlist follows: "Name of Television Show No. 1"—"Title of Episode of Television Show No. 1", 7:00 PM 03/16/2006; "Name of Television Show No. 2"—"Title of Episode of Television Show No. 2", 8:30 PM 03/16/2006; and, "Name of Television Show No. 3"—"Title of Episode of Television show No. 3", 9:30 PM 03/16/2006.

While an embodiment of the time-schedule playlist has been described with a specific format of title, start time, and start date, it will be appreciated that the scope of the invention is not so limited, and that the invention will also apply to other formats of time-schedule playlists that contain at least an identification of the media content and the time to begin playback. Further, while an embodiment of the time-schedule playlist has been described containing television video media, it will be appreciated that the scope of the invention is not so limited, and that the invention will also apply other types of media such as movie video media, news video media, music audio media, and podcast audio media, that may be combined, or interleaved, within a playlist, for example.

It will be appreciated that the example playlist described above schedules three shows. The first show is a 30 minute show and the second and third shows are each 1 hour shows. Therefore, the first show will end at 7:30 PM. The second show will begin playback at 8:30 PM, and the third show will begin immediately following the second show. Accordingly, it will be appreciated that there is a one-hour intentional gap in the continuity of media playback between 7:30 PM and 8:30 PM.

In an embodiment, the user schedules the media contained within the PMP 100 to be played back, on-demand, at the times desired. The user can schedule gaps in the time-schedule playlist to accommodate other scheduled activities, such as helping children with homework, for example. In the example above, there is the one-hour intentional gap scheduled from 7:30 PM to 8:30 PM.

In an embodiment, the PMP 100 is connected to the larger monitor 200 to provide a time period of entertainment that may be shared with multiple viewers. In an embodiment, the PMP 100 is configured to browse the internet 500, to determine a specific schedule of a set, or segment, of broadcast media content programming, such as for a particular evening of programming on a specific channel, download the set of broadcast media programs from an internet to the PMP 100 when available, and in response to a user-specified date and time, begin playing the set of broadcast media programs.

The user may desire to indicate high priority content media, such as news reports, severe weather reports, stock price activity reports, and other content, for example. In an embodiment, the PMP 100 is configured to be responsive to priority content media, specified by the user, by interrupting the playback of the media specified in the time-schedule playlist, to play the priority content media. Alternatively, rather than interrupting the current playlist, in an embodiment, content designated as priority content may be stored for subsequent playback. In an embodiment, the user can explicitly select specific content stored on the PMP 100 as priority content, and can also select categories of content as priority content. In an embodiment, the priority content can be real-time, contemporaneous content, such as a breaking news report, for example.

In an embodiment, the PMP 100 is configured to allow the user to specify how the PMP 100 will resume playing of the time-schedule playlist following interruption by priority content according to at least one of: shifting the content of the time-schedule playlist; and, rejoining the content of the time-schedule playlist. In an embodiment, the PMP 100 will shift the content of the scheduled playlist, such that it will pick up where it left off when the content stream of the time-schedule playlist was interrupted by the priority content. Alternatively, the user may select to have the PMP 100 rejoin the media content stream of the time-schedule playlist at the point it would have been in the schedule independent of the interruption (as if it had not been interrupted) by the priority content. This allows the user the choice to not miss any content, or to not change the timing following the interruption of the playlist by the priority content. In an embodiment, the priority media content are real time media, relating to events of current interest, that have been specified by the user, and obtained from the internet 500 as they become available.

As discussed above, the time-schedule playlist can include intentional gaps. A time-schedule playlist can also have unintentional gaps, such as may result if a television show is primed of commercials, for example. For example, a typical 30 minute television show, when pruned of commercials, may be about 22 minutes long. In an embodiment, the PMP 100 will categorize and respond to gaps in a variety of ways, as specified by the user. In an embodiment, the PMP 100 is configured to be responsive to a gap in the continuity of the set of media programs in the time-schedule playlist by performing at least one of the following user specified responses: turning off the PMP 100, and the monitor 200 if so attached; playing media content explicitly specified, such as a particular song, music video, and video clip for example; playing media content from a second media playlist, such as a collection of songs, music videos, and video clips for example; playing priority content media; and playing media content classified by category, such as music, video, photographs, and podcast, for example, and sub-category, such as news, weather, and sports, for example. The response of the PMP to gaps in the time-schedule playlist may be known as gap handling.

Considering the example playlist above, it may be that removal of commercials from the TV Show No. 2 episode will shorten its length by fifteen minutes. In this example, the user may specify to have the PMP 100 invoke another playlist including 1970's music to fill the unintentional gap created by the removal of the commercials. This will result in music play for 15 minutes followed by the playback of TV Show No. 3, starting at the scheduled time of 9:30 PM.

While an embodiment has been described with examples of gap-response actions such as turning off the PMP, playing media content explicitly specified, playing media content from a second media playlist, playing priority content media, and playing media content classified by category and sub-category, it will be appreciated that the scope of the invention is not so limited, and that other gap-response actions are contemplated, such as a simulcast option to combine multiple content streams, using alternative channels and modes, such as directing "breaking news" to the left speaker, for example.

It will be appreciated that PMP's 100 have a finite amount of storage space available within the program storage device 125 for content. In an embodiment, the PMP 100 has the wireless connection 75, and is capable to retrieve media content, to be incorporated into the time-schedule playlist, from the sources 99, 500 without a hardwired connection. In an embodiment, the connection 75 between the PMP 100 and the internet 500 is configured to allow the download of a first set of media content, to be included as part of the time-schedule playlist. Further, in an embodiment the PMP 100 is configured to allow the download of the first set of media content from the internet 500 in the absence of user initiation. Accordingly, such PMPs 100 will benefit from a provision to specify how media shall be removed from the program storage device 125 to ensure adequate storage space for the addition of new material. In an embodiment, the PMP 100 will automatically offload, or remove, content from the program storage device 125 in a manner specified by the user. As used herein, the term automatically refers to operations that may occur without user intervention or initiation, but that will be subject to criteria that have been specified or defined by the user.

In an embodiment, to provide storage space in the program storage device 125 of the PMP 100, the PMP 100 is configured to identify a second set of media content, which shall be automatically removed from the program storage device to provide storage space necessary for the download of new media content. In an embodiment, the PMP 100 is configured to identify the second set of media content in response to at least one of: the current time matching a date and time combination specified by the user to remove the particular media content file; and, playback of the first set of media content on the PMP 100. That is, in an embodiment, the user may associate with each media file a specific date and time for the media file to be removed from the program storage device 125. This will be helpful to prevent the finite amount of storage of the program storage device 125 in the PMP 100 from becoming full, which would prevent the PMP 100 from holding all of the content that the user wishes to view in a given play list.

In an embodiment, the PMP 100 is configured to copy the second set of media content, such as media content that is not part of the time-schedule playlist, and media content from the time-schedule playlist that has already been played, for example, from the PMP 100 to the processing unit 99 for archival storage. Further, the PMP 100 is configured to remove the second set of media content from the PMP 100 to provide storage space in the program storage device 125.

In another embodiment, the user can specify a variable number of days of time-schedule playlist content to be stored within the program storage device 125 of the PMP 100 as the first set of media content. In an embodiment, the PMP 100 will automatically remove content, identified as the second set of media content, from the program storage device 125 to attempt to provide the necessary space for the variable number of days of time-schedule playlist content specified. In an embodiment, the PMP 100 is configured to determine if there is enough storage space available within the program storage device 125 for the first set of media content, or, the variable number of days of time-schedule playlist. In response to the program storage device 125 lacking the necessary amount of space for the variable number of days of time-schedule playlist specified following the removal of the second set of media content, the PMP 100 is configured to allow the user to select, from a group of options, the content to identify a third set of media content to remove and transfer to the program storage device 10 of the processing unit 99 for archival storage. In an embodiment, the PMP 100 is configured to arrange the media content for user selection to copy to the processing unit 99 and remove from the PMP 100 by at least one of: content arranged by the date, or a chronological order, that it was downloaded to the PMP 100; content arranged in a chronological order by it's prior play date; and, content arranged by category, such as priority content, photographs, audio content, and video content, for example. In an embodiment, the PMP 100 is configured to calculate how far back that the media content arranged by chronological order according to prior view date must extend to accommodate the removal of enough content to make space for the specified variable number of time schedule playlist, following the removal of the second set or media content.

Figure 2:
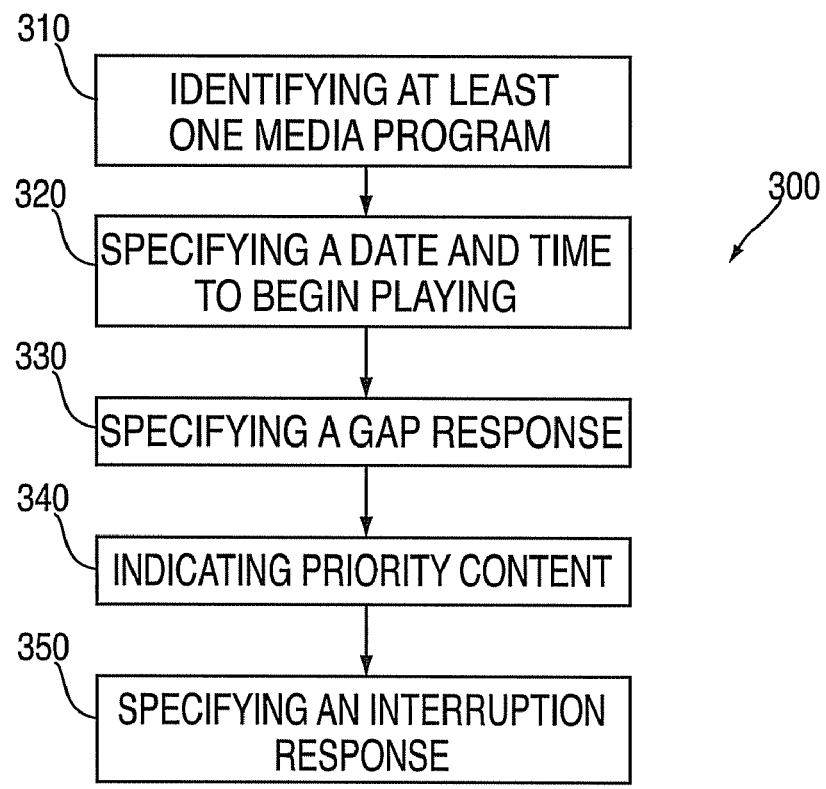
FIG. 2 illustrates one example of a flowchart of a method to create a time-schedule playlist in accordance with an embodiment of the invention.

In view of the foregoing, the PMP 100 performs the method of creating a time-schedule playlist of media content. Referring now to FIG. 2, an embodiment of a flow chart 300 depicting an exemplary method of creating a time-schedule playlist of media content within the PMP 100, is depicted. The method begins by identifying 310 at least one media program stored on the PMP for playing and specifying 320 the date and time to begin playing each media program, thereby providing the time-schedule playlist. In an embodiment, the identifying 310 includes at least one video media program. Additionally, the method includes specifying 330 the gap-response to the gap in the continuity of media playback in the schedule of the time-schedule playlist and, indicating 340 as priority content, media to play, thereby interrupting the time-schedule playlist in progress. The method also includes specifying 350 an interruption-response following each interruption of the time-schedule playlist.

In an embodiment, the specifying 330 the gap-response includes allowing the user to specify from more than one gap-response the action that the PMP 100 will tale in response to a gap in the continuity of the media in the time-schedule playlist. In an embodiment, the specifying 330 the gap-response includes turning off the PMP 100, and, if the video monitor 200 has been attached to the PMP 100, also turning off the attached monitor 200.

In another embodiment the specifying 330 the gap-response includes playing media content that the user has explicitly selected, or specified, such as a particular favorite song, or music video, for example. In another embodiment, the specifying 330 the gap-response includes playing media content from a second media playlist, such as a collection of favorite songs or music videos, for example. In another embodiment, the specifying 330 the gap-response includes playing priority content media.

In an embodiment, the indicating 340 priority content media comprises at least one of: indicating specific media, such as a particular news show; and, indicating categories of media, such as categories of: news reports; weather reports; and, stock price reports, for example. In an embodiment, the indicating 340 as priority content includes real-time media, such as a contemporaneously broadcast news report, or a breaking news story, for example.

In an embodiment, the specifying 330 the interruption-response includes shifting the content of the time-schedule playlist. In an embodiment, the specifying 330 the interruption-response includes rejoining the content of the time-schedule playlist.

In another embodiment, the PMP 100 is also capable to time shift segments of broadcast programming, with each segment containing a set of content. As used herein, the term broadcast programming will include programming that is in a predefined arrangement, such as a sequence of media available from a programming source. The programming source may be delivered in a variety of ways, such as cable, and over the internet, for example, and is not intended to be limited to television radio signals. This is accomplished by determining a specific schedule of a set of broadcast media, downloading the set of broadcast media to the PMP 100 from the internet 500, and specifying a date and time to begin playing the set of broadcast media. In an embodiment, the downloading the set of broadcast media to the PMP 100 from the internet 500 occurs via the processing unit 99 in signal communication with the PMP 100.

Figure 3:
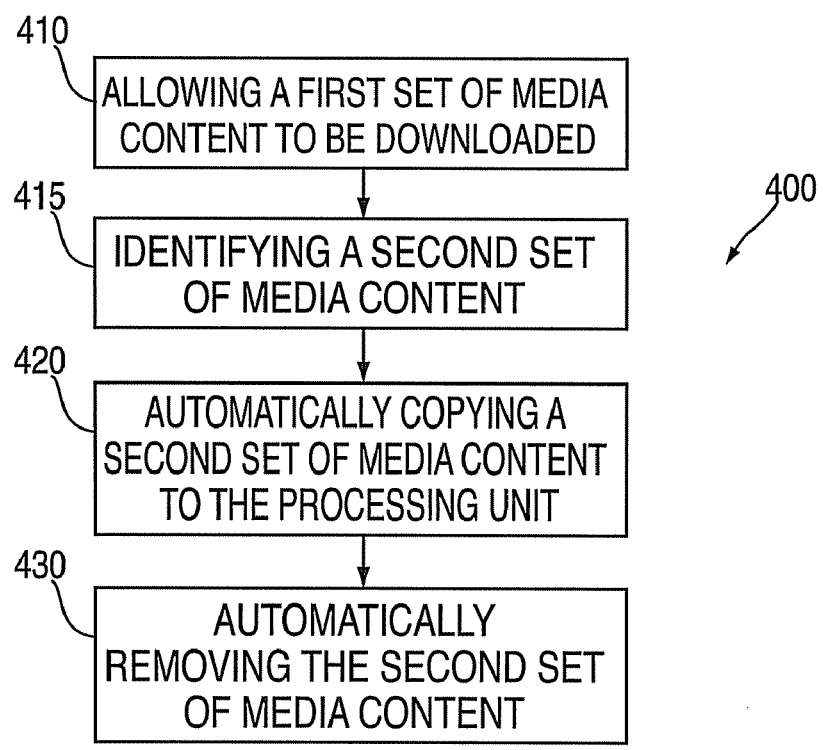
FIG. 3 illustrates one example of a flow chart of a method to remove media content from a MP in accordance with an embodiment of the invention The detailed description explains the preferred embodiments of the invention, together with advantages and features, by way of example with reference to the drawings.

In view of the foregoing, the PMP 100 performs the method of automatically removing media content from the program storage device 125 as specified by the user. Referring now to FIG. 3, a flow chart 400 depicting an embodiment of an exemplary method of removing media content from the PMP 100 is depicted. The method includes allowing 410 the first set of media content, to be included as part of the time-schedule playlist, to be downloaded from the internet 500 to the PMP 100, and identifying 415 a second set of media content from all of the media content stored on the PMP 100. In response to identifying 415 the second set of media content: automatically copying 420 the second set of media content from the PMP 100 to the processing unit 99 in signal connection with the PMP 100 for archival storage; and, automatically removing 430 the second set of media content from the PMP 100. In an embodiment, the identifying 415 the second set of media content occurs in response to at least one of: the current time matching a date and time combination specified by the user to remove with the media content; and, playing the first set of media content. That is, in response to playing media content in the time-schedule playlist, the played media content will become part of the second set of media content, and will be automatically removed from the program storage device 125. In an embodiment, media content may be offloaded with higher granularity than a set of content, that is, each individual content item can be offloaded individually, or by content type or theme, for example.

While an embodiment of the invention has been described as allowing a first set of media content, to be included as part of the time-schedule playlist, to be downloaded from the internet, it will be appreciated that the scope of the invention is not so limited, and that the invention will also apply to media players that allow media content to be downloaded from other sources, such as purchased media software, for example as may be stored on a digital video disk (DVD) for example, media content that has been transmitted as electromagnetic waves such as television and radio signals, and media content that has been delivered via cable, for example.

In an embodiment, the allowing 410 the download of the first set of media content from the internet 500 to the PMP 100 occurs in the absence of user initiation. In an embodiment, the allowing 410 download of the first set of media content includes allowing 410 the download of the first set of media content from the internet 500 via the processing unit 99 in signal connection with the PMP 100. In an embodiment, the allowing 410 the download of the first set of media content and the copying 420 the second set of media content occur via the wireless connection 75.

In another embodiment, the method of automatically removing media content includes specifying a variable number of days of a time-schedule playlist, the time-schedule playlist including the first set of media content to allowed to be downloaded, and determining if removal of the second set of media content will provide enough space on a program storage device of the MP for the specified variable number of days of the time-schedule playlist. If it is determined that the removal of the second set of media content will not provide enough space, arranging the media content stored on the program storage device 125 by at least one of: chronological ordering according to download date; chronological ordering according to prior play date; and categorization of media content; and allowing the method to proceed via having the user select a third set of media content from the arranged media content for removal. In an embodiment, the method further includes calculating the number of days of media content, arranged by chronological ordering according to prior play date, to be removed, thereby providing space for the first set of media content.

While an embodiment of the invention has been described providing exemplary content arrangement modes, it will be appreciated that the scope of the invention is not so limited, and that other modes of content arrangement contemplated will be included by the invention, such as an option to arrange by spatial ordering according to media content file size, allowing a "least replaced" option to keep favorite media content, and spatial ordering according to a "best fit" determination to provide enough space on the program storage device of the MP for the specified variable number of days of the time-schedule, for example.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of removing stored media content from a media player (MP), the method comprising:
    allowing a first set of media content to be downloaded to the MP for playing;
    identifying a second set of media content from all media content stored on the MP;
    in response to the identifying the second set of media content, automatically copying the second set of media content from the MP to a processing unit in signal connection with the MP for archival storage, and, automatically removing the second set of media content from the MP;
    wherein the identifying the second set of media content occurs in response to at least one of: the current time matching a date and time combination specified by a user to remove the media content; and, playing the first set of media content;
    specifying a variable number of days of a time-schedule playlist, the time-schedule playlist comprising the first set of media content allowed to be downloaded;
    determining if removal of the second set of media content will provide enough space on a program storage device of the MP for the specified variable number of days of the time-schedule playlist;
    in response to determining that the removal of the second set of media content will not provide enough space, arranging the media content stored on the program storage device by at least one of:
        chronological ordering according to download date;
        chronological ordering according to prior play date;
        categorization of media content; and
        spatial ordering according to media content file size; and
        spatial ordering according to a best fit determination to provide enough space on the program storage device of the MP for the specified variable number of days of the time-schedule playlist; and
        selecting a third set of media content from the arranged media content for removal.

2. The method of claim 1, wherein:
    the allowing the download of the first set of media content from the internet to the MP occurs in the absence of user initiation.

3. The method of claim 1, wherein:
    the allowing the download of the first set of media content from the internet to the MP comprises allowing the download of the first set of media content from the internet via the processing unit in signal connection with the MP.

4. The method of claim 1, wherein:
    the allowing the download of the first set of media content and the copying the second set of media content occur via a wireless connection.

5. The method of claim 1, wherein:
    the allowing the download of the first set of media content comprises allowing the downloading of a first set of video media content.

6. The method of claim 1, wherein:
    the identifying the second set of media content from the MP occurs in response to playing the second set of media content stored on the MP.

7. The method of claim 1, further comprising:
    calculating the number of days of media content, arranged by chronological ordering according to prior play date, to be removed, thereby providing space for the first set of media content.

8. A program storage device readable by a machine, the device embodying a program or instructions executable by the machine to perform the method of claim 1.

9. A media playback system comprising:
    a media player (MP) configured to store and play media content;
    a connection between the MP and an internet, the connection configured to allow the download of a first set of media content from the internet to the MP; and
    a processing unit in signal connection with the MP, the MP configured to identify a second set of media content to automatically copy from the MP to the processing unit for archival storage, the MP also configured to automatically remove the second set of media content from the MP;
    wherein the MP is configured to identify the second set of media content in response to at least one of: the current time matching a date and time combination specified by the user to remove the media content; and, playback of the first set of media content; and
    wherein the MP is configured to determine if there is enough storage space for a variable number of days of a time-schedule playlist comprising the first set of media content in response to removal of the second set of media content;
    in response to a lack of storage space for the variable number of days of the time-schedule playlist, the MP is configured to arrange the media content for user selection and removal by at least one of:
        a chronological order according to download date;
        a chronological order according to prior play date; and
        a category of media.

10. The system of claim 9, wherein:
    the MP is configured to allow the download of the first set of media content from the internet in the absence of user initiation.

11. The system of claim 9, wherein:
    the MP is configured to allow the download of the media content from the internet via the processing unit.

12. The system of claim 9, wherein:
    the MP is configured to store and play video media content.

13. The system of claim 9, wherein:
    the signal connection between the MP and the processing unit is a wireless connection.

14. The system of claim 9, wherein:
    the MP is configured to identify the second set of media content in response to playing the first set of media content stored on the MP.

15. The system of claim 9, wherein:
    the MP is configured to calculate the number of days of media content, arranged by chronological order according to prior view date, to be removed to provide space for the first set of media content.

16. The system of claim 9, wherein:
    the MP is a personal media player (PMP), configured to be carried by a user.

* * * * *